United States Patent [19]

Miller

[11] Patent Number: 5,038,904
[45] Date of Patent: Aug. 13, 1991

[54] FRICTION CLUTCH WITH IMPROVED PRESSURE PLATE SYSTEM

[75] Inventor: Steven G. Miller, Cincinnati, Ohio

[73] Assignee: JMW, Inc., Lawrenceburg, Ind.

[21] Appl. No.: 418,246

[22] Filed: Oct. 6, 1989

[51] Int. Cl.$^5$ .................................................. F16D 25/061
[52] U.S. Cl. ................................. 192/70.2; 192/85 AA
[58] Field of Search ............ 192/70.2, 96, 101, 85 AA

[56] References Cited

U.S. PATENT DOCUMENTS

| | | | |
|---|---|---|---|
| 1,577,901 | 3/1926 | Fawick | 192/70.2 |
| 2,738,864 | 3/1956 | Becker | 192/70.2 |
| 2,954,040 | 9/1960 | Bolster | 192/85 AA |
| 3,291,273 | 12/1966 | Hansen | 192/85 AA |
| 3,631,953 | 1/1972 | Snoy | 192/70.2 |
| 3,926,020 | 12/1975 | Dantowitz et al. | 74/217 |
| 4,373,622 | 2/1983 | Michael | 192/85 AA |
| 4,421,218 | 12/1983 | Haight | 192/85 AA |
| 4,479,570 | 10/1984 | Kamio | 192/85 |
| 4,566,577 | 1/1986 | Tsuboi | 192/85 |
| 4,614,254 | 9/1986 | Mery et al. | 192/70.2 |
| 4,664,240 | 5/1987 | Majima et al. | 192/85 |
| 4,664,242 | 5/1987 | Downs | 192/85 AA |
| 4,674,613 | 6/1987 | Sikorski | 192/52 |
| 4,805,752 | 2/1989 | Malloy et al. | 192/85 AA |

Primary Examiner—Allan D. Herrmann
Assistant Examiner—Andrea Pitts
Attorney, Agent, or Firm—Charles R. Wilson

[57] ABSTRACT

A friction clutch primarily useful on a motorcycle utilizes a variable pressure plate system. The variable pressure plate system comprises a stationary pressure plate and a movable pressure plate which are mounted on the clutch to be in operable association with the clutch's drive plates and driven plates. The two pressure plates together form a chamber to hold a pressurized gas. The pressurized gas is capable of evenly exerting a force on the movable pressure plate which in turn evenly contacts the plates to engage the system. The movable pressure plate responds to a release mechanism to move it out of engagement with the drive and driven plates.

14 Claims, 4 Drawing Sheets

FRICTION CLUTCH WITH IMPROVED PRESSURE PLATE SYSTEM

This invention relates to a friction clutch. More particularly, the invention relates to a friction clutch for use on a motorcycle wherein an improved pressure plate system is utilized.

Motorcycles generally have a primary drive system which transfers power from an engine crankshaft to the rear wheel. A clutch is used together with a set of gears to permit a smooth transference of the power. The clutch and gears permit an easy start and a progressive acceleration. The clutch also allows a complete interruption of power transfer so that the engine can idle without any power being transferred to the motorcycle's wheels.

Motorcycle clutches are usually of the friction type comprised of a set of driven plates and drive plates mounted in close proximity to one another. These plates are collectively referred to as clutch plates. The clutch operates by joining or engaging the clutch plates. By forcing the clutch plates together slowly, friction causes the plates to eventually turn as one. In the engaged position the clutch plates are held together. In the disengaged position, the clutch plates are separated. Normally a pressure plate is mounted adjacent the endmost driven plate to force lateral movement of all the clutch plates.

A set of coil springs is most commonly used to apply pressure to the clutch's pressure plate. The springs force the driven and drive plates together in a very smooth manner. Over time, the springs lose their force at varying rates so that unequal spring pressures result. Additionally, as the clutch plates wear, the springs loose their ability to apply the proper pressure to the plates. This can cause clutch drag, clutch slippage, chatter, vibration and wobble on the pressure plates when disengaged. Most springs need frequent adjustment. It ultimately becomes necessary to replace all the springs with the consequent expense.

There is a need for an improved pressure plate system as found in the widely used friction clutches. A pressure plate system is needed which is capable of exerting an even pressure over a prolonged period and under varying use conditions. In accord with this need, there has been developed an improved pressure plate system.

SUMMARY OF THE INVENTION

A friction clutch is comprised of a clutch basket, at least one drive plate, at least one driven plate, a clutch hub, a drive shaft, and a variable pressure plate system. The pressure plate system is comprised of a stationary pressure plate and a complimentary movable pressure plate which are mounted to the clutch hub. The pressure plates are configurated so as to form a gas chamber which is capable of holding at least 10 psi pressure. A release mechanism operably connected to the system causes the movable pressure plate to move out of contact with the clutch plates so that the drive an driven plates float free of one another.

DETAILED DESCRIPTION OF THE INVENTION

The present invention is described with reference to the drawings. FIGS. 1-6 illustrate a friction clutch which embodies the invention. The particular clutch illustrated is used on a motorcycle. It should be understood that the invention has application to other forms of friction clutches and other uses thereof.

Figure 1:
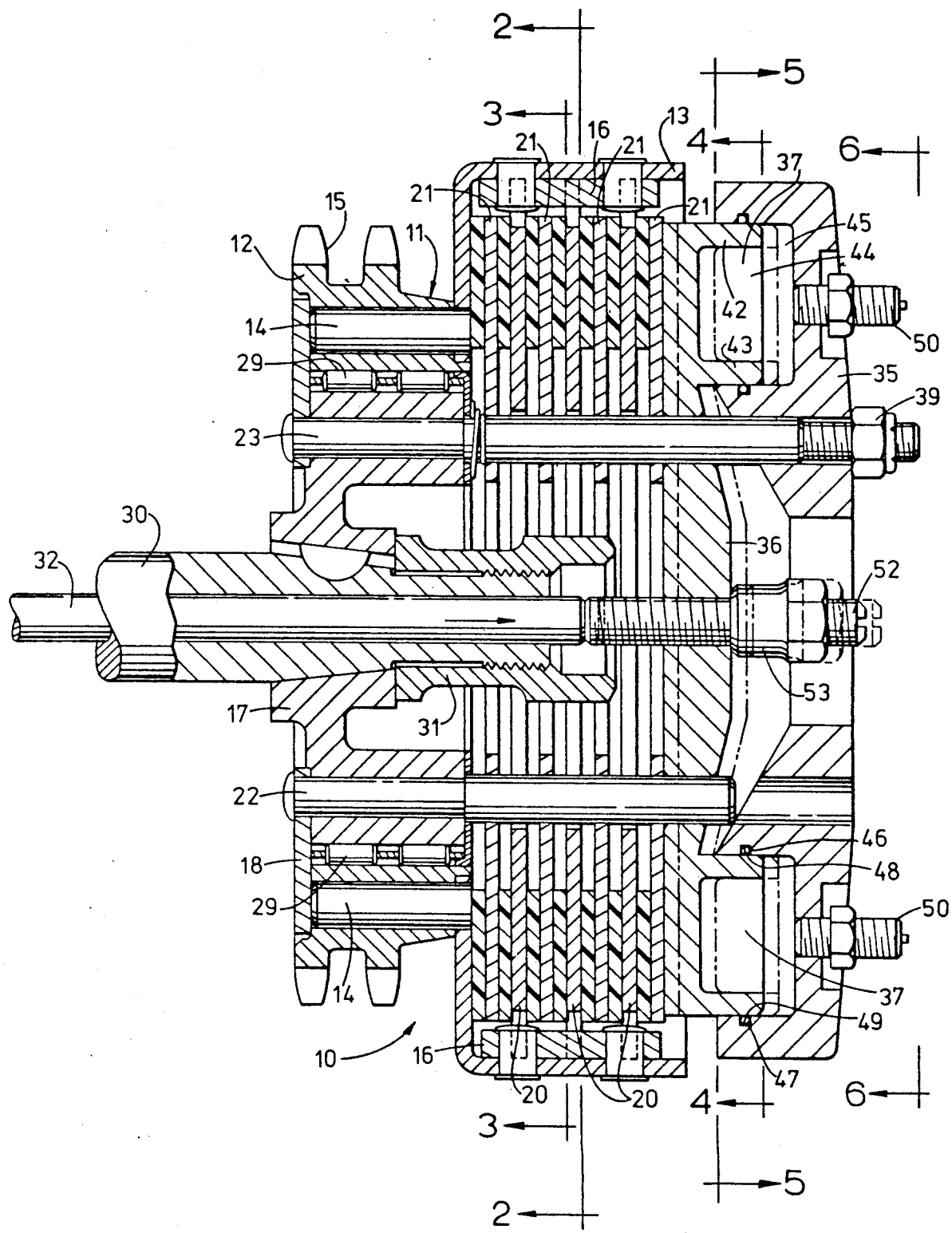
FIG. 1 is a side view in section of the friction clutch of this invention.

With reference to FIG. 1 there is shown a friction clutch 10. The clutch comprises as its essential components a clutch basket, clutch plates, clutch hub, drive shaft and a variable pressure plate system. Each of the components and its mode of operation are described in the following paragraphs.

The clutch basket 11 serves to receive power from the motorcycle's engine. It comprises a sprocket 12 and a housing 13 secured together by rivets 14. As shown the sprocket 12 of the clutch basket has a set of teeth 15 extending around its outer circumference. While not shown, a continuous chain or a set of gears from the engine supplies power to turn the sprocket. The basket 11 serves to contain the drive and driven plates as further discussed below. Keys 16 are riveted to the inside surface of the clutch basket at spaced intervals. Each key extends the length of the drive and driven plates when stacked together and are intended to mate with keyways in the drive plates as discussed below. The clutch basket with its component parts is designed to freely and continuously spin during operation.

Figure 2:
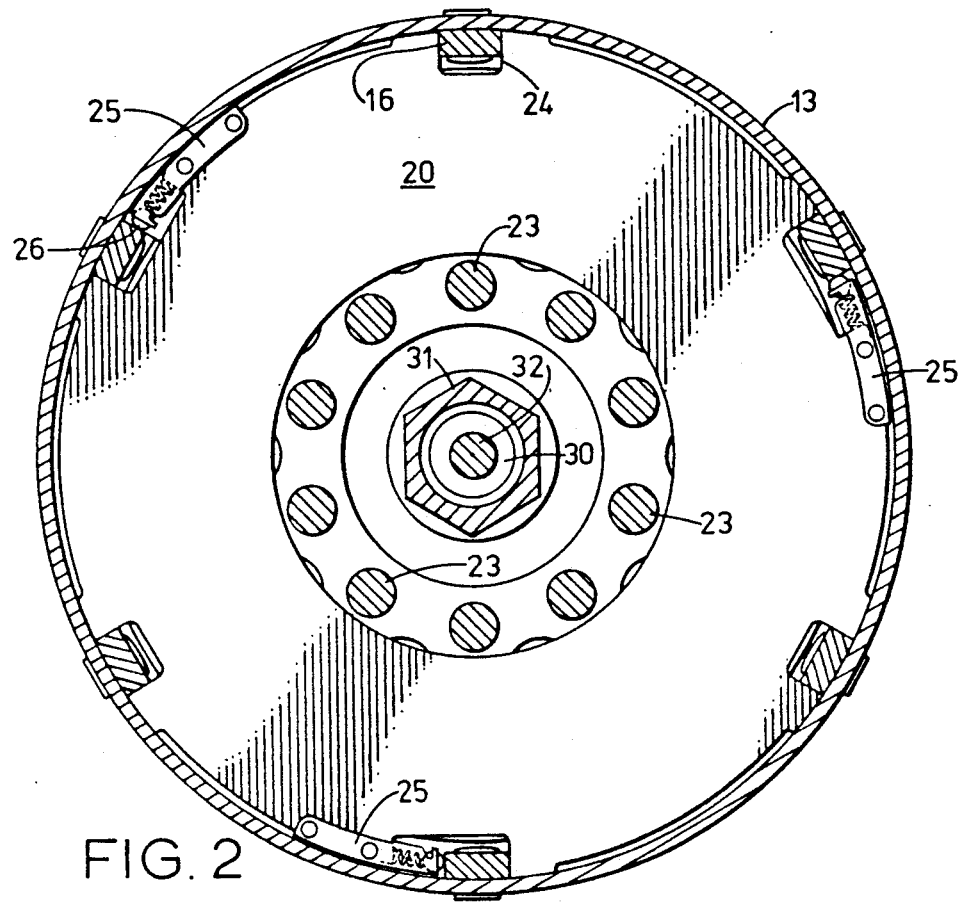
FIG. 2 is a sectional view taken along line 2—2 of the friction clutch of FIG. 1 showing a drive plate.

Clutch plates consisting of drive plates 20 and driven plates 21 are positioned in the clutch basket. At least one of each of the plates is needed, though multi-plate clutches are preferred. Most preferably, at least three drive and at least four driven plates are used. As shown, three drive plates 20 and four driven plates 21 are stacked alternately together. The drive plates, as best seen in FIG. 2, are flat and circular-shaped with an opening in the center to accommodate a set of stationary studs 22 and bolts 23 extending from the clutch hub 17 and facing cover 18. The drive plates are so configured to allow them to freely spin about the studs and bolts when at rest, as in the idle position.

Each drive plate has a set of keyways 24 on its outer periphery. The six keyways shown are slots which are dimensioned to fit around the elongated keys 16 found on the clutch basket. Buffers 25 positioned adjacent three of the keyways are for the purpose of reducing rattle between the drive plate and keys during operation. The buffers are riveted to the plate at a position whereby a ball bearing 26 engages a side of the key. Drive plates 20 are manufactured from a tempered steel, though other rigid materials can as well be used in their manufacture.

Figure 3:
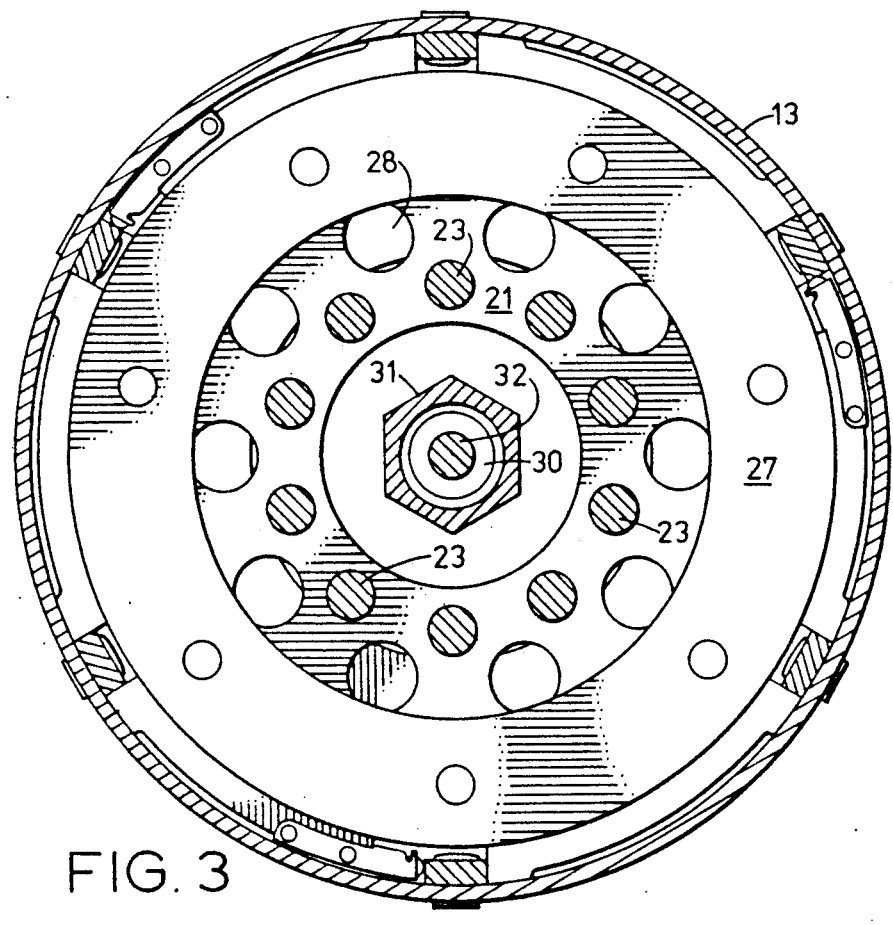
FIG. 3 is a sectional view taken along line 3—3 of the friction clutch of FIG. 1 showing a driven plate.

Driven plates 21, as best seen in FIGS. 1 and 3, are also circular-shaped. They have a flat steel base with friction facing 27 extending inwardly from each plate's outer periphery. The friction facing is a material which has a high coefficient of friction and is heat resistant. The friction facing is used on each side of a plate where frictional engagement is made with a drive plate 20. Thus, the endmost driven plate has a friction facing on only one surface while the remaining driven plates all have the friction facings on both surfaces. Alternatively, the driven plates can be made entirely of a suitable friction material in which case they are flat. A set of holes are added to the plates to accommodate studs 22 and bolts 23. An open center is provided to accommodate the drive shaft. Holes 28 in the plates are also provided for weight reduction purposes.

Driven plates 21 are positioned on the studs 22. Studs 22 extend from the clutch hub 17 so that when the driven plates are made to revolve, they cause the clutch hub to also revolve. Clutch hub 17 is rotatably secured to the clutch basket 11. A set of roller bearings 29 are provided for a smooth revolution of the clutch basket on the clutch hub.

The drive shaft 30 extends through the clutch hub and into the clutch basket. The drive shaft, providing power output, leads to the motorcycle's transmission. The drive shaft is secured to the clutch hub by means of a locking nut 31. A push rod 32, forming a part of the clutch's release mechanism, extends through the drive shaft. Its operation is discussed below.

In accord with this invention, a variable pressure plate system is used to effect engagement and disengagement of the clutch. The system, best seen in FIGS. 1, 4, 5 and 6, comprises a stationary pressure plate 35 and a movable pressure plate 36. The pressure plates are configured so as to form a pressurized gas chamber 37. The pressure plate system is positioned at the end of the clutch basket and is secured to the clutch hub by means of a set of bolts 23 which extend through holes 40 and the nuts 39. Holes 41 are also provided to receive shorter studs 22 for stability purposes. The system is positioned to be in operable association with the clutch plates. That is, the movable pressure plate will normally contact the endmost driven plate with sufficient lateral force to cause all the clutch plates to be in frictional contact with one another. When the release mechanism is operated, the moveable pressure plate will be forced away from the endmost driven plate so that the clutch plates will float free of one another.

Figure 4:
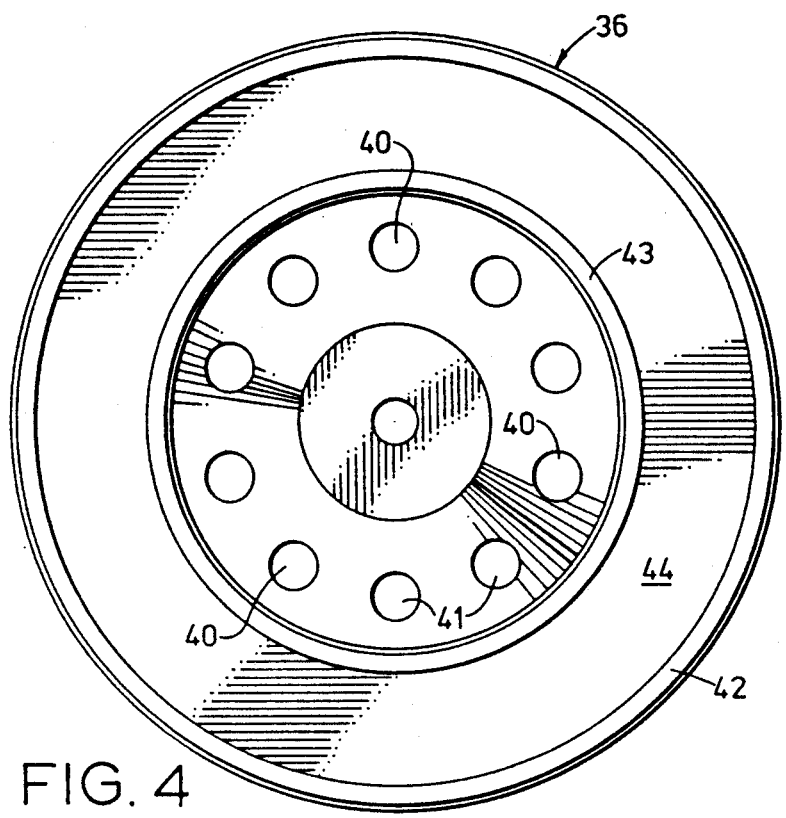
FIG. 4 is an end view showing the inside surface of the movable pressure plate used on the friction clutch of FIG. 1.

The moveable pressure plate 36, as seen in FIGS. 1 and 4 is a circular plate with an outer flange 42 extending perpendicularly from the plate and an inner flange 43 also extending perpendicularly from the plate. The two flanges together form a channel 44. The holes 40 and 41 are inside the inner flange 43.

Figure 5:
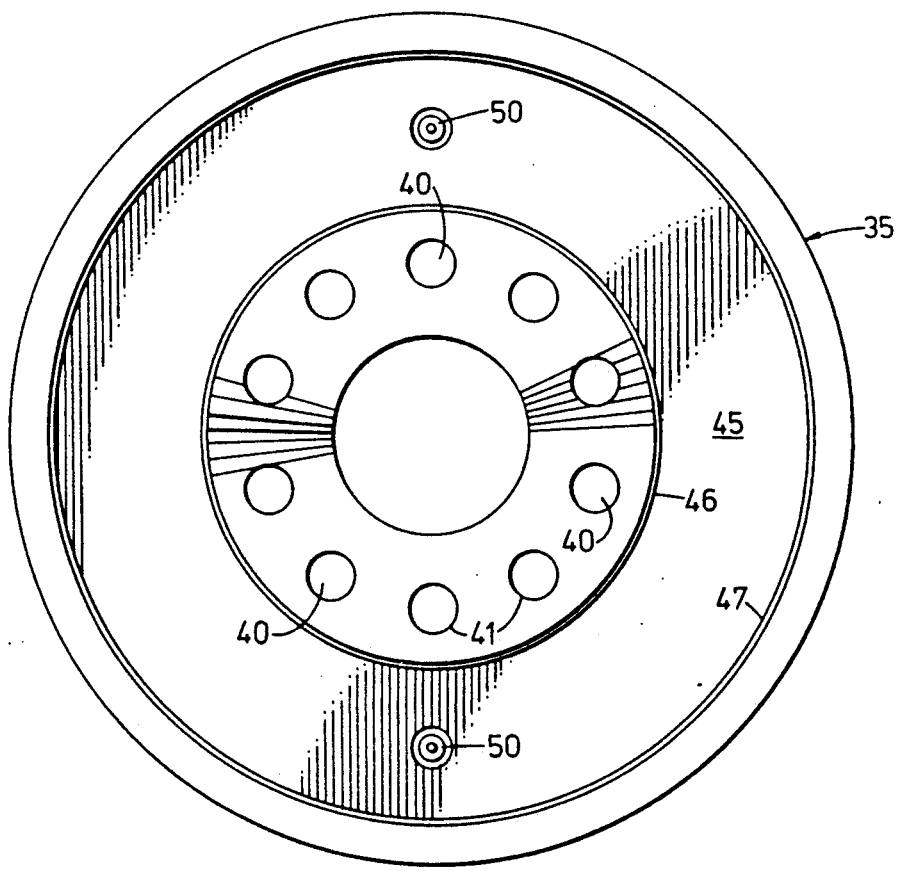
FIG. 5 is an end view showing an inside surface of the stationary pressure plate used on the friction clutch of FIG. 1.
Figure 6:
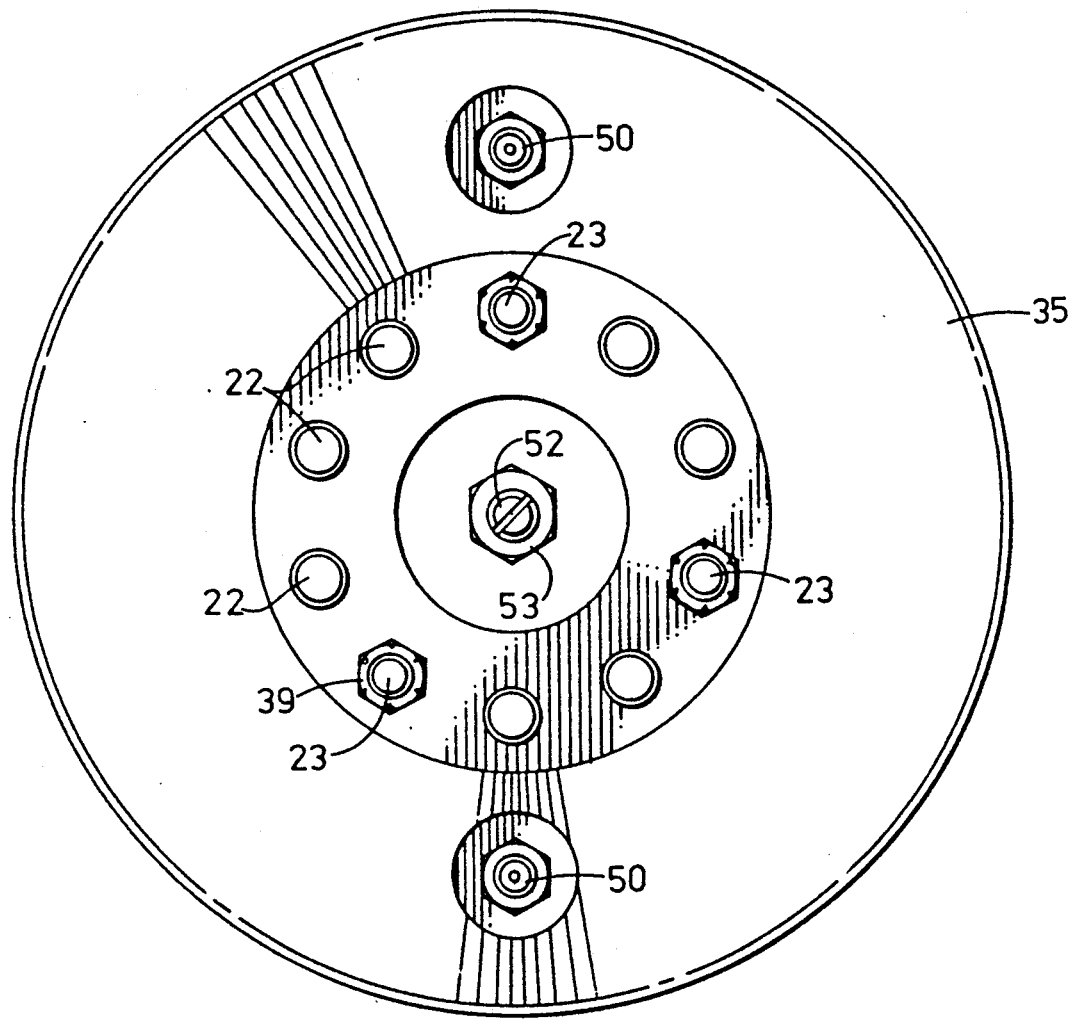
FIG. 6 is an end view of the friction clutch of FIG. 1 showing the outside surface of the stationary pressure plate.

Stationary pressure plate 35 also has a channel so as to receive the flanges of the movable pressure plate 36. As best seen in FIGS. 1 and 5, a channel 45 is machined into the circular plate. It is dimensioned to receive flanges 42 and 43 of the movable pressure plate in an air tight manner. O-rings 46 and 47 are provided to fit in grooves 48 and 49 respectively in the channel 45 and to aid in this purpose. During use of the clutch, the flanges of the moveable plate slide in the channel 45 of the stationary pressure plate.

The flanges of the moveable pressure plate and the channel of the stationary pressure plate together form an enclosed annular gas chamber which is capable of holding pressure of at least about 10 psi, preferably from about 15 psi to about 25 psi. It is the force provided by the gas in the pressurized gas chamber 37 which causes the movable pressure plate 36 to exert an even and constant lateral force on the clutch plates. It should be evident that the annular gas chamber 37 disposed around the inside surfaces of the pressure plates will always have a constant pressure within it and this constant pressure will always cause the movable plate itself to exert a uniform lateral force onto the clutch plates. The resultant constant equal application of force eliminates any need for adjustment as found with the conventionally used coil springs.

Gas inlet valves 50 are provided to initially pressurize the system. The valves are in communication with the gas chamber. A conventional air or gas pump is used to supply the gas pressure. Air is normally used, though an inert gas such as nitrogen is also usable. The pressure in the chamber is retained during the life of the clutch, though can be resupplied as the drive and driven plates wear or pressure requirements change. Two inlet gas valves are shown, though one is sufficient.

A bolt 52 is secured to the movable pressure plate by lock nut 53. It is disposed coaxially of the push rod 32. The push rod is positioned to laterally move the bolt 52 and associated movable pressure plate when desired. The bolt and push rod are integral parts of the clutch release machanism shown in FIG. 1. The motorcycle operator controls the release mechanism through a clutch lever normally mounted on the motorcycle's handlebar. The clutch lever is operably attached to the push rod 32. When the lever is pulled toward the handlebar, a cable that runs from the lever to the push rod causes the clutch to disengage.

In operation, power from the engine is supplied to the sprocket of the clutch basket. This causes the basket and consequently the drive plates to continuously revolve. When the clutch is engaged by releasing the clutch lever, the variable pressure plate system forces the moveable pressure plate into contact with the outermost driven plate. In turn, all the clutch plates are forced together in frictional relationship. As such, the drive plates cause the driven plates to revolve which in turn causes the clutch hub and drive shaft to rotate. Output power imparted to the drive shaft is transferred to the motorcycle's drive train. Closing the clutch lever forces the moveable pressure plate out of contact with the drive plate with the result being the driven plates cease revolving and there is an interruption of power output to the drive shaft.

The above described varible pressure plate system has been made with reference to one clutch commercially available. Other clutches are available and the pessure plate system of this invention is readily adapted thereto. For example, one known clutch has driven plates which have a set of internal teeth around an annular opening. The teeth engage gear teeth or splines on a clutch hub to revolve. Several other clutch release mechanisms are also known and can be adapted for use with this invention. For example, known rack-and pinion releases, rocker arm releases, cam releases, ball and ramp releases, screw releases and hydraulic releases can be used. Any release which is capable of forcing the movable pressure plate to move out of engagement with the driven and drive plates is usable.

While the invention has been described in particular with reference to the drawings, it should be understood the preferred form may be changed. All obvious modifications and changes to the described friction clutch are within the scope of the appended claims.

What is claimed is:

1. A friction clutch for use on a motorcycle, said clutch having an improved pressure plate system for controlling the transfer of power from the motorcycle's engine to its drive train, said clutch comprising:
   (a) a clutch basket with means to receive power input from the motorcycle's engine;
   (b) at least one drive plate which is fixedly engaged with the clutch basket so that power input received by the clutch basket causes said drive plate to rotate about its axis;
   (c) at least one driven plate disposed in close proximity to the drive plate such that when forced together by sufficient lateral forces they frictionally engage to cause said driven plate to revolve with said drive plate;
   (d) a clutch hub mounted within the clutch basket so as to revolve therein, said clutch hub fixedly engaged to the driven plate;
   (e) a drive shaft fixedly attached to the clutch hub such that rotation of the hub causes the drive shaft to rotate to transfer power to the motorcycle'drive train; and
   (f) a variable pressure plate system for engaging the drive and driven plates of the clutch, said system comprised of a stationary pressure plate securely mounted to the clutch hub and a movable pressure plate slideably mounted thereto such that when engaged it exerts a sufficient lateral force on an endmost driven plate to cause all the plates to be in frictional contact with one another and when disengaged allows said plates to float free of one another, wherein said stationary and movable pressure plates together from an enclosed gas chamber which has a constant pressure of at least about 10 psi maintained therewithin.

2. The friction clutch of claim 1 wherein the stationary and moveable pressure plates are each circular-shaped, said stationary pressure plate having an annular channel extending around its inside surface, with gasket means on the walls of the channel and said movable pressure plate having an outer flange extending from the plate and an inner flange extending from the plate to form an annular channel, the walls of which are dimensioned to slide into the channel of the stationary plate and to form the gas chamber.

3. The friction clutch of claim 2 wherein from about 15 psi to about 25 psi is maintained in the gas chamber.

4. The friction clutch of claim 2 further wherein a gas inlet valve extends from an outer face of the stationary pressure plate directly into the gas chamber.

5. The friction clutch of claim 1 wherein said clutch is a multi-plate clutch.

6. The friction clutch of claim 5 wherein at least three drive plates and at least four driven plates are mounted in the clutch basket for frictional engagement.

7. The friction clutch of claim 2 further wherein a friction material is bonded to at least one face of each driven plate.

8. The friction clutch of claim 2 further wherein a friction material is bonded to at least one face of each drive plate.

9. The friction clutch of claim 7 wherein each driven plate has a friction material on each face where contact is made with a drive plate.

10. The friction clutch of claim 1 further comprising a release mechanism to force the moveable pressure plate out of engagement with the driven and drive plates.

11. The friction clutch of claim 1 wherein the means on the clutch basket to receive power input from the engine is a sprocket wheel to engage an endless chain.

12. The friction clutch of claim 11 wherein the clutch basket has a set of keys disposed longitudinally along its inner surface and the drive plates have keyways on their outer periphery to match said keys and lock thereto.

13. The friction clutch of claim 12 wherein the clutch hub has a set of studs extending therefrom into the clutch basket and the driven plates have a set of holes to allow the studs to pass therethrough and effectively fix the driven plates to the clutch hub.

14. The friction clutch of claim 13 further comprising a push rod which extends longitudinally through the drive shaft and a bolt which extends through the movable pressure plate such that the ends of the push rod and bolt contact when the clutch is disengaged.

* * * * *